(12) United States Patent
Gronau et al.

(10) Patent No.: US 8,472,726 B2
(45) Date of Patent: Jun. 25, 2013

(54) DOCUMENT COMPARISON AND ANALYSIS

(76) Inventors: Yuval Gronau, Tel Aviv (IL); Edo Likhovski, Mevaseret Zion (IL)

( * ) Notice: Subject to any disclaimer, the term of this patent is extended or adjusted under 35 U.S.C. 154(b) by 298 days.

(21) Appl. No.: 12/929,199

(22) Filed: Jan. 7, 2011

(65) Prior Publication Data
US 2012/0177291 A1 Jul. 12, 2012

(51) Int. Cl.
*G06K 9/00* (2006.01)
(52) U.S. Cl.
USPC .......................................... 382/218; 717/124
(58) Field of Classification Search
USPC ............................................................ 382/218
See application file for complete search history.

(56) References Cited

U.S. PATENT DOCUMENTS

| | | | | |
|---|---|---|---|---|
| 5,754,673 | A * | 5/1998 | Brooks et al. | 382/112 |
| 5,787,198 | A | 7/1998 | Agazzi et al. | |
| 6,272,244 | B1 * | 8/2001 | Takahashi et al. | 382/190 |
| 6,351,553 | B1 * | 2/2002 | Hayosh | 382/139 |
| 6,865,290 | B2 * | 3/2005 | Kohchi | 382/165 |
| 7,076,086 | B2 * | 7/2006 | Miyake et al. | 382/112 |
| 7,120,318 | B2 | 10/2006 | Tyan et al. | |
| 7,190,470 | B2 * | 3/2007 | Burquist et al. | 358/1.14 |
| 7,715,045 | B2 | 5/2010 | Sussmeier et al. | |
| 7,779,355 | B1 | 8/2010 | Erol et al. | |
| 7,990,561 | B2 * | 8/2011 | Okabe | 358/1.15 |
| 8,229,230 | B2 * | 7/2012 | Hayber | 382/218 |
| 8,280,196 | B2 * | 10/2012 | Magai et al. | 382/305 |
| 2002/0146176 | A1 * | 10/2002 | Meyers | 382/218 |
| 2003/0103238 | A1 | 6/2003 | MacLean et al. | |
| 2004/0223648 | A1 * | 11/2004 | Hoene et al. | 382/218 |
| 2005/0139671 | A1 * | 6/2005 | McGlamery et al. | 235/449 |
| 2005/0276442 | A1 * | 12/2005 | Alasia et al. | 382/100 |
| 2006/0159347 | A1 * | 7/2006 | Derks et al. | 382/218 |
| 2007/0067713 | A1 | 3/2007 | Ming | |
| 2007/0146791 | A1 * | 6/2007 | Murase | 358/1.16 |
| 2007/0279711 | A1 * | 12/2007 | King et al. | 358/508 |
| 2009/0028392 | A1 | 1/2009 | Ramachandrula et al. | |
| 2010/0074509 | A1 | 3/2010 | Laaser et al. | |
| 2011/0249299 | A1 * | 10/2011 | Wu et al. | 358/3.26 |

* cited by examiner

*Primary Examiner* — Hadi Akhavannik

(57) ABSTRACT

A method including a process by which a first digital image of the document is obtained. A second digital image of a document is retrieved from a computer, a mobile device, a computer network or by imaging of a second document. The method includes calculating the transformation between the first and second digital images such as geometrical distortion, local brightness and contrast differences and blurring due to the optical imaging process. The method estimates the parameters of these transformations so that the transformations can be applied to one of the images, rendering it as similar as possible to the other image. The method further compares the two images in order to find differences such as addition, deletion or changing of characters or words.

The method further displays the differences on a display such as a computer screen or mobile device screen or reports to the user that the two documents are identical.

48 Claims, 13 Drawing Sheets

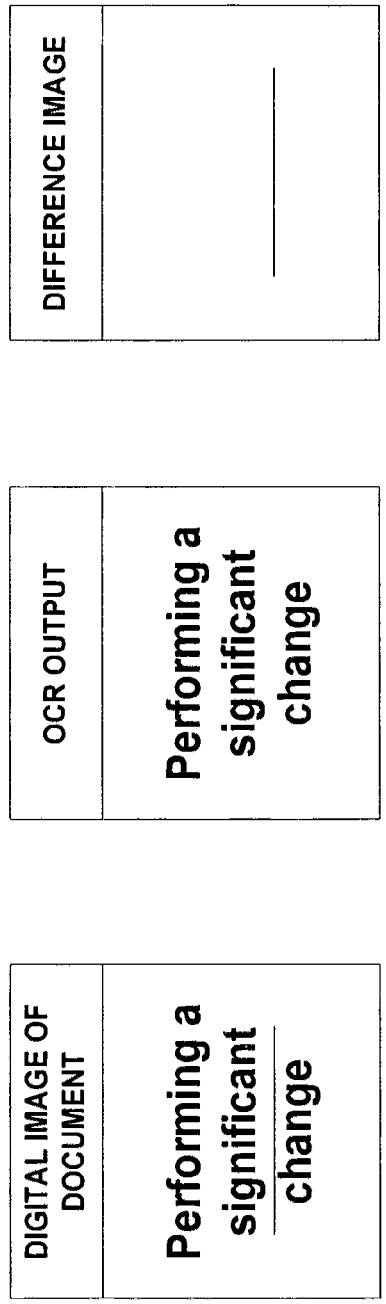

DOCUMENT COMPARISON AND ANALYSIS

FIELD OF THE INVENTION

The present invention relates to a process for simulating how a document would have appeared for the purpose of comparing it to another document, for the purpose of obtaining a feedback on an OCR process, or for other purposes.

BACKGROUND OF THE INVENTION

Comparison of two documents is a common practice. When the two documents are written in character code, and each character has its own binary representation, such comparison is fairly simple; the binary string of one document is compared to the binary string of the other document. However, when one (or both) documents is in image format (or contains images), where the characters are not individually represented, and are expressed in pixels indistinguishable from other images (of characters or drawings) in the document, the comparison becomes complicated.

The two most common procedures for comparing two documents which are not in character code format are: (1) by proof reading both documents and verifying that they are similar. The proof reading procedure is both time consuming and prone to errors; (2) by converting the image format to a character code format using an OCR (Optical Character Recognition) software and then comparing two character files with a comparison tool such as is available in many word processing programs. If one (or both) documents are in paper form a scanner is typically used to create an electronic image of the document.

This OCR procedure is limited in several ways:
1. The OCR program may not recognize all the characters correctly. The accuracy rate of OCR programs for printed Latin script is considered to be around 97%-99%, and in other scripts the accuracy is lower.
2. OCR programs typically recognize only one language per document, do not distinguish between different colors in the text, the document's layout is typically not preserved, nor are the borders of tables in the text,
3. The OCR procedure is time consuming. Tests have shown that this process may not save any time compared to the manual task of proof reading the two documents, in large part due to the need to review and correct errors resulting from the OCR process.
4. OCR program performance is largely dependent on having an image which is sharp and taken under uniform and controlled illumination conditions. This necessitates using a scanner. However when the document is in paper form and a scanner is not available, OCR process will not work properly.
   As a result of the reasons elaborated above, using OCR software as part of document comparison procedure does not provide a complete and reliable method.

Sussmeier et al (U.S. Pat. No. 7,715,045) describe a method for comparing documents that is based on image comparison instead of text comparison. In the described method, a paper document is scanned by a scanner and the image is compared to a second digital image of a second document on a pixel by pixel level to generate a score indicating the similarity degree between the two images. One document is transformed to resemble the second document by deskewing, adjusting, offsetting as well as normalizing the brightness of one of the documents to match the other document. The transformations described in that patent are global, i.e. apply to the complete image, and are limited only to digital images created by a scanner that are sharp and taken under uniform and controlled illumination conditions.

These assumptions, i.e. the validity of global geometrical and radiometric (brightness and contrasts) parameters as well as the assumption that the acquired image is sharp and may be compared to a digital image created from a text file are typically not valid when the imaging device is a handheld camera and especially when it is a miniature camera such as those cameras typically installed in mobile devices. Furthermore, the method described which contains a pixel by pixel comparison will result in many false-positive signals, for the reasons explained below.

Miyake et al. (U.S. Pat. No. 7,076,086) describe an image inspection device that compares an output, i.e. printed paper on a printer's output tray to a digital source image for the purpose of print quality control.

The method involves a fixed CCD camera that is mounted above the output tray and forms an image of the output printed page. The method performs geometrical and radiometric transformations as well as image resizing and blurring in order to simulate the imaging process and allow easy comparison of the original image and the captured image of the printed paper. A simple Gaussian blurring process is implemented for the simulation of the blurring caused by the camera. Since the camera is fixed in a constant position with respect to the fixed output tray, the geometrical and blurring transformations may be assumed fixed and their parameters may be estimated at the time of design of the system.

The assumptions by Miyake et. al. do not deal with cases where the document is imaged by a low quality camera under variable conditions both in the spatial domain and the temporal domain.

It is the intent of the document comparison method described below to deal with geometrical distortions, illumination conditions and blurring that are not know in advance and vary from one image to another and also within the image. Furthermore, it deals with general blurring functions and not only with theoretical Gaussian blur functions.

In addition, the method described in this patent for comparing a digital image and a corresponding text file may serve as part of an improved OCR algorithm. The method serves as a feedback mechanism allowing to detect potential errors and highlight them or correct them.

SUMMARY

According to an aspect of the invention, a method includes obtaining two images of a document. The two digital images of presumably similar documents are then adjusted so they correspond geometrically, i.e. features of one image are located at similar picture coordinates as the features in the second image. The geometrical transformation is performed in two stages. First, a global transformation is calculated that best fits the first image to the second image. Then, a fine adjustment is performed on a local level in a running window. The second transformation calculates the residual transformation that is required in each local window in order to best align the features of the first image to the features of the second image. Thus, a local mapping function is created that describes the required geometrical transformation relevant to every area in the first image.

This local mapping function is analyzed in order to indicate if it is continuous. If discontinuities are located, then these discontinuities may indicate that a character or a word have been added, deleted or changed. In such a case, the difference may be indicated to the user.

If no discontinuities are located, then one image may be transformed to geometrically fit the other image.

In a second stage, the brightness, contrast and blurriness of one image is fitted to that of the second image. In some instances, when the capturing device of one of the images is a handheld device, the illumination and blurring of the captured image may not be uniform in all areas of the image and not known in advance. Therefore, the parameters of these transformations may be calculated for each local region in a running window. After estimation of the parameters of these transformations, one image may be transformed to resemble the second image in terms of brightness, contrast, color and sharpness. The images may then be compared in order to indicate regions where there are differences between the two images that may result from addition, deletion or changing of characters or drawings in one document with respect to the other document.

The comparison process may include, but is not limited to preprocessing of the images, i.e. noise removal, subtraction of images, filtering of the subtracted image, local or global thresholding operations and postprocessing of the thresholded image. Statistical analysis of the probability that a change exists may also be applied.

If changes are believed to be found between the two documents then these may be saved to a storage device and also presented to a user for further verification.

According to another aspect of the invention, the method described above may be used as part of an improved OCR algorithm.

OCR software makes guesses as to the text appearing in an image file. Using the comparison method described above, once the OCR software outputs a proposed text of the image file, this proposed text can be reconverted to an is image file and compared in accordance with a method described above to find any differences between the original image and the simulated image of the text output by the OCR software. The comparison described would then serve as feedback on the output of the OCR software. Such feedback can then be used for various purposes, such as hi-lighting to the reader that certain proposed characters, words, borders of tables, the page's layout and the document's colors may not be identical to the original image file, or as a feedback to the OCR software that a different best guess may be required for the differences which were identified.

BRIEF DESCRIPTION OF THE DRAWINGS

The accompanying figures together with the description herein serve to explain the details of the preferred method for document comparison.

FIG. 7 exemplifies a missing line in the output of an OCR algorithm.

DETAILED DESCRIPTION OF PREFERRED EMBODIMENTS

The present invention provides an improved method for comparing two documents in image format, in order to verify that the two documents are similar or if they are different to display the differences between the two documents.

Figure 1A:
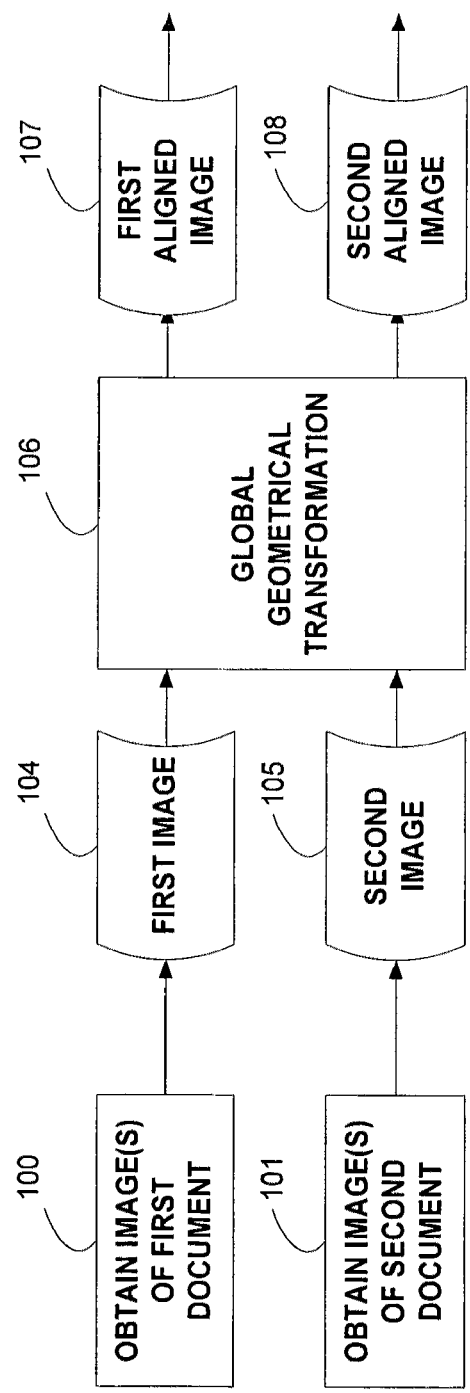
FIGS. 1A through 1C depict a block diagram of the preferred method of document comparison.
Figure 1B:
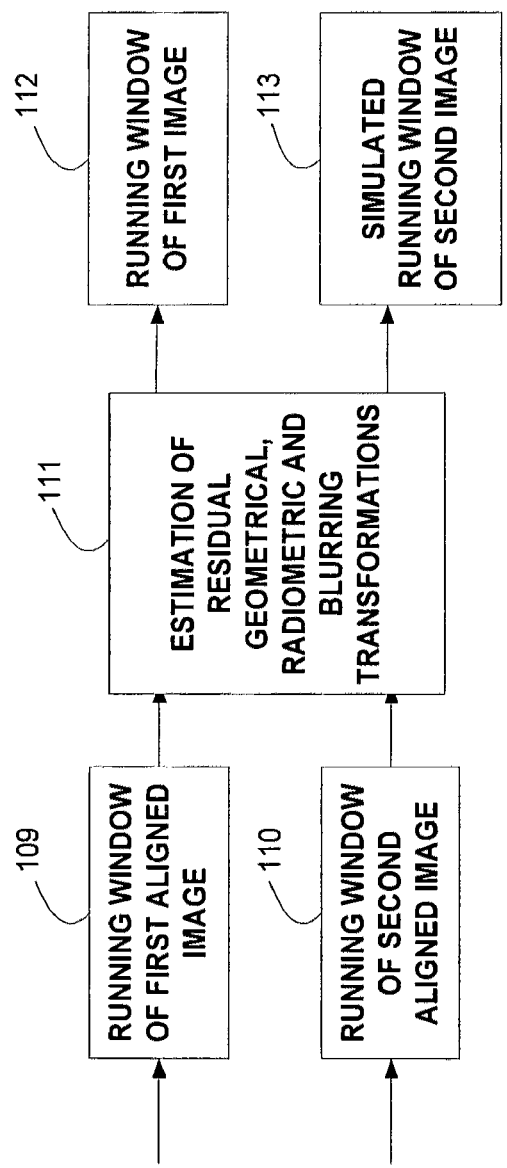
Figure 1C:
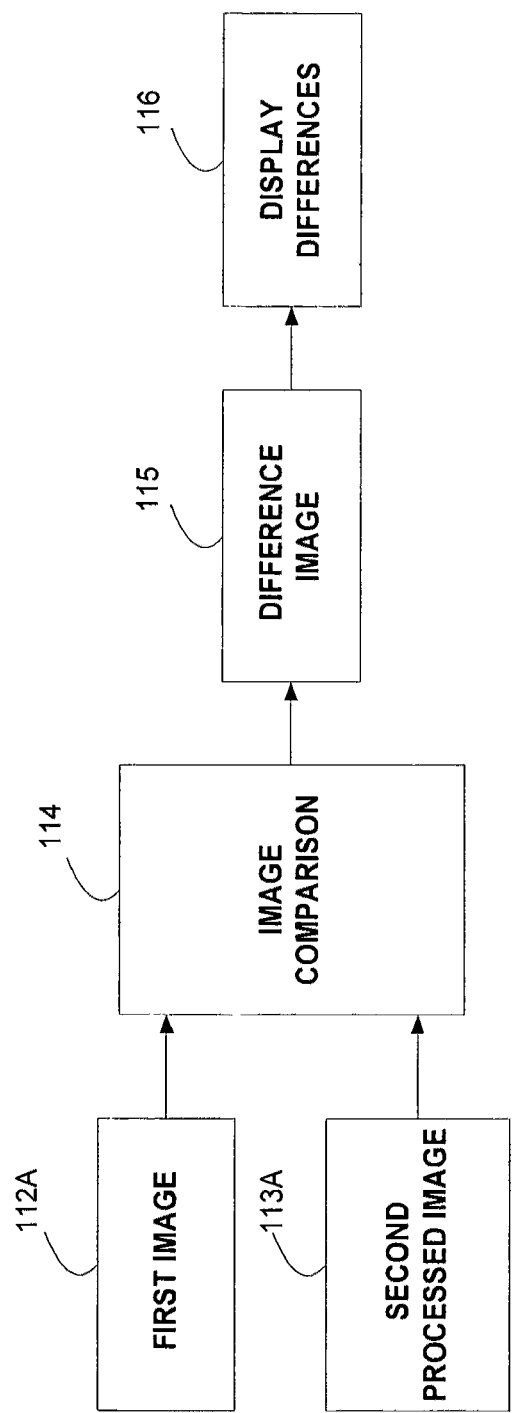

FIG. 1 is a simplified block diagram of the method of this invention.

In step 100, a first digital image 104 of a first document is obtained.

In step 101, a second digital image 105 of a second document is obtained.

Obtaining one or both images may include scanning, capturing with a digital camera, transforming a text image into a digital image with appropriate software or retrieving from storage.

In certain cases, the second digital document may not be present on the same storage device as the first image. In that case it is transferred to a common memory storage as the first image for common processing. Without limitation, the processing may be performed on the device that served for capturing the first image or on a remote device.

It should be clear that while the description refers to an image of a document, it is generalized also to more than one image of a certain page, i.e. a case where each image corresponds to half of the page or to several images of several pages. An image of a page may be created by joining several images of parts of the page, i.e. with a software for creating panoramic images, such as provided by PTGui (www.ptgui.com).

The two digital images 104 and 105 of the two presumably similar documents may have different characteristics such as image resolution, sharpness, brightness and contrast.

In order to facilitate the comparison of the two images, a global geometrical transformation is performed in step 106. This transformation may include, but is not limited to, translation in the vertical and horizontal axes, magnification, rotation, skewing and optical distortion correction. The global geometrical transformation may be implemented using a first stage of feature detection in both images such as Harris corner detection and a second stage of matching between the features of both images.

The parameters of the geometrical transformation are then applied to one of the images or to both images 104, 105 and as a result, the features, i.e. characters in both aligned images 107 and 108 lie in roughly the same coordinates, facilitating the task of comparing the documents.

It is important to note that while the global geometrical transformation 106 resulted in the features being roughly positioned at the same coordinates, there may still be some shift between the features in both aligned images 107 and 108. This may result from residual errors that were not properly modeled by the global transformation or by changes in the features of the two documents such as deletion, addition or changing of characters or words in one of the documents compared to the second document.

Comparing the two aligned images 107 and 108 at this stage on a pixel by pixel level would result in significant differences of the images even when the two documents are actually similar. This may lead to many false positives or to reduction of the sensitivity of the method.

In order to facilitate the comparison between the two images 107 and 108 and obtain very high sensitivity to changes, while maintaining a very low false positive rate, the two images should be transformed to be as similar as possible.

This requires that the characters or other features be positioned at the same picture coordinates with sub-pixel accuracy. In addition, the brightness, contrast and color of the two images should be similar and the sharpness of the characters should be similar. The latter is especially important when one image is captured by a low quality camera while the second image is created from a digital text file. Failing to adjust the sub-pixel position of the image features, the brightness, contrast and color and the sharpness would result in differences between the two images 107 and 108 which could cause false positives or reduce the sensitivity of the method to changes between the documents. An example of the pixel to pixel differences between two images that are misaligned by half a pixel is depicted in FIG. 2E.

It is important to note that the parameters of the subpixel alignment, the brightness, contrast and color and the sharpness adjustment may not be uniform for the entire image. Specifically, optical distortions may cause the mismatch between features in the two images to vary in different regions of the image.

Addition, deletion or changing of features or characters would also affect the geometrical mismatch differently in different regions of the document.

Nonuniform illumination of the document at the time of the acquisition or nonuniformities in the sensitivity of the camera may also lead to differences in the radiometric transformation (brightness, contrast and color) between the two images. Using one brightness and one contrast constants in order to adjust the brightness and contrast of the two images 107 and 108 may not suffice in order to correctly adjust these parameters in all the regions of the image. Therefore it is preferable to calculate such a transformation in a running window allowing for adjustment to nonuniformities of the illumination. The running windows may be foreign to one another (without overlaps) or partially overlapping. The transformation may be calculated on an area greater than the window. The size of the window may be optimally adapted to the rate of spatial variation in the geometrical, radiometric or blurring parameters or by considerations relating to calculations complexity and memory size.

The blurring of the images, especially an image captured by a handheld imaging sensor may also vary in different areas of the image. One reason for this is that the best focus may be obtained in one area of the image while another area suffers from some amount of defocus. It is very typical that the center of the image is acquired at best focus with least blurring while the corners of the image are out of focus and more blurry. It is therefore desirable to estimate the blur function parameters separately in different regions of the image. One should note that the blurring function, i.e. the spread of energy of the image of a bright source of light (also known as the Point Spread Function (PSF)) is typically not a Gaussian function. The Gaussian function is only a convenient approximation but not a very accurate one. A more general model of the blurring process is that every point in the captured image is a linear combination of the light intensities of a region of neighboring points. For pixelized digital images, each pixel value in the captured digital image may be approximated as a linear combination of the intensity values of the pixels in the digital image of the original text document.

Figure 2A:
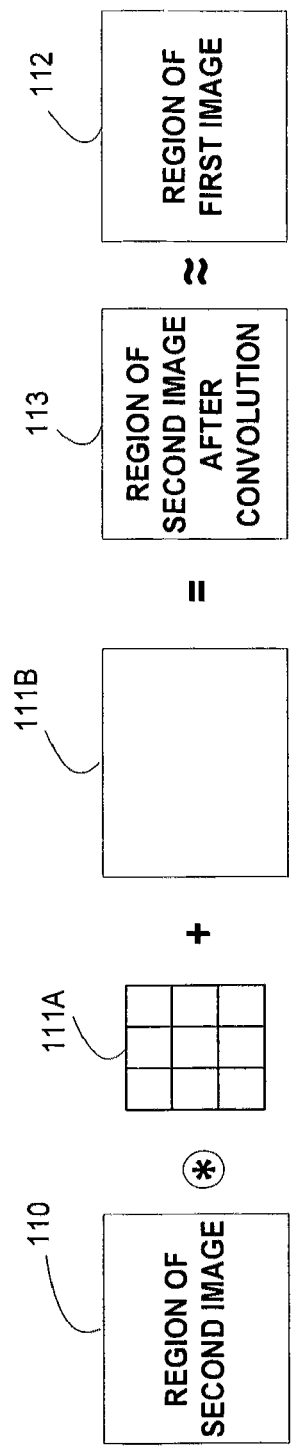
FIGS. 2A through 2D depict methods for estimating the geometrical, radiometric and blurring transformations between the two image regions.

This is also known as a convolution of the digital image of the original text with a kernel representing the blurring function, as demonstrated in FIG. 2A. As mentioned above, the coefficients of the linear combination or the convolution kernel 111A and the constant gray level 111B may vary from one region of the image to another. One may notice also that by modeling each pixel in one region of one image as a linear combination of all the pixels in a window around that pixel in the second image plus a constant, one may also estimate the translation between the two images, as well as the brightness, contrast and color changes between the two images. The coefficients of the convolution determine the translation, contrast and blurring and the constant level determines the background level. Therefore the method described above may be combined to a transformation 111 that combines the geometrical, radiometric and blurring transformations required in order to render one image as similar as possible to the other image.

is The process described above may be performed separately for different regions of the images in order to allow for different translations, illumination and blurring in the different regions.

Figure 2B:
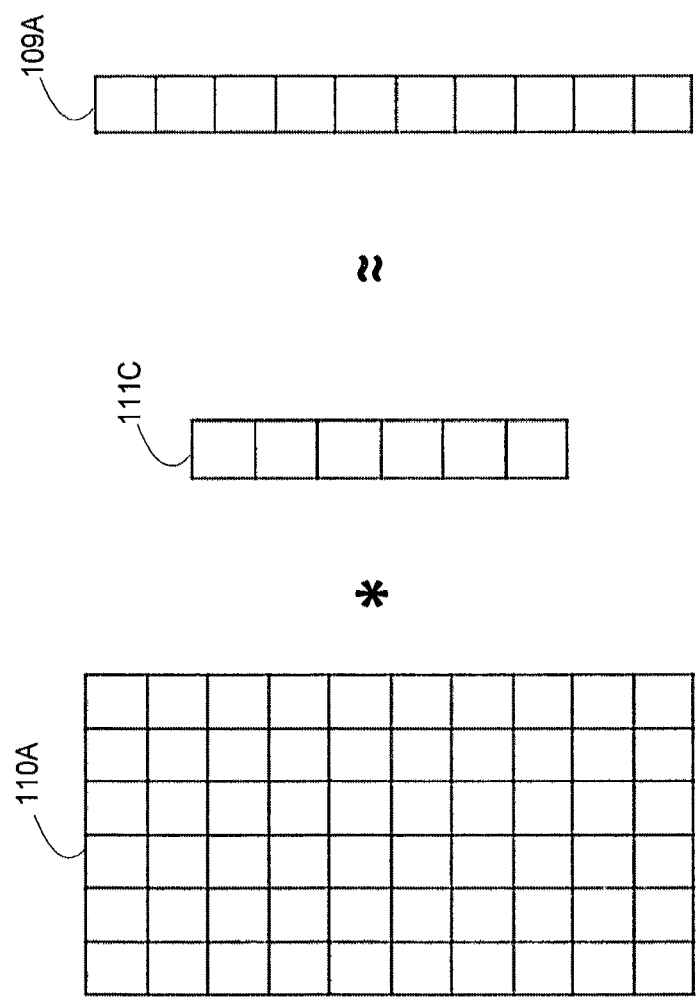

FIG. 2B depicts one method of estimating the coefficients of the linear combination 111 by defining a region (window) 109 in one image as the independent variable 109A. The two-dimensional image region 109 may also be represented as a vector 109A. The dependent variables are several regions 110 from the second image that are translated by zero, one, two or more pixels to the right, left, up and down directions with respect to the first image region 109. For example, the dependent variables may be a similar region from the second image and also eight other regions translated by one pixel in each one of eight directions, including diagonally. A constant image is taken as an additional dependent variable. In this example we get ten dependent variables. The dependent variables that are two dimensional matrices may also be represented as vectors by concatenating the columns of the matrices into one long vector. These vectors may then be arranged in a matrix 110A, in which each column represents one position of the original image and an additional column represents a unit vector. One knowledgeable in the field may notice that this representation is typical of linear regression or Least Squares problems and may easily be solved by well known methods. The solution of this problem gives the optimal coefficients of the transformation 111 in a vector form. These coefficients are the coefficients of the convolution kernel and the constant. Thus, an image region 109 of one image may be represented as a linear combination 111C of image regions 110 of the second image plus a constant. Combining the intensity values of the image regions 110 of the second image according to the optimal coefficients 111C that were calculated results in a new image region 113 that closely resembles the region 112 of the first image. This linear combination 111 takes into account the geometrical translation, radiometric differences and blurring differences between the two images. The simulated image region 113 closely resembles the first image region 112 and can be easily and accurately compared to the first image region 112. Thus, subtle differences between the two image regions 112 and 113 may be detected while maintaining a low false positive rate. One may note that the sum of the coefficients of the linear combination does not have to equal unity. When the sum is different from unity, the contrast of the simulated image is different than the contrast of the original image.

Another method of estimating the parameters of the local geometrical, radiometric and blurring transformations 111 is by performing a local Fourier analysis on a region 109 of the first image and comparing it to the Fourier analysis of a region 110 of the second image. The region in which the analysis is performed may be a rectangular window or a continuous weighting function such as a Hamming, Hanning or Gaussian window, but not limited to these specific weighting functions.

Figure 2C:
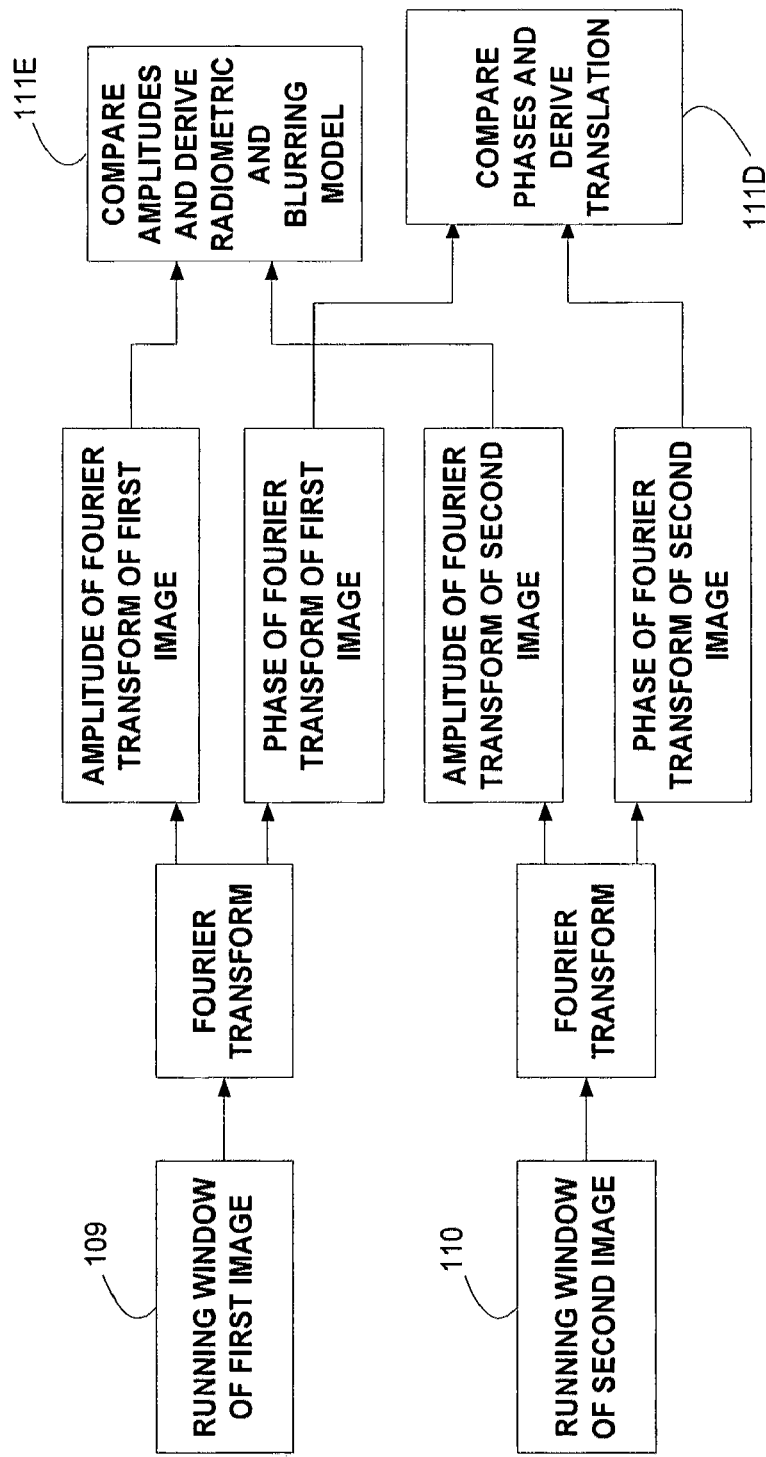

It is evident to those who are knowledgeable in the art, that sub-pixel shifts between features in the first window 109 and corresponding features in the second window 110 may be estimated by model 111D (FIG. 2C), by finding the linear shift of the phase in the frequency analysis. Similarly, the blurring of one image region 109 with respect to the blurring of the other image region 110 may be estimated by model 111E by calculating the ratio of the amplitudes of the coefficients in the frequency analysis and fitting an appropriate model. The brightness, contrast and color transformations may also be estimated by the ratio of the amplitudes of the coefficients in the frequency analysis. Thus, the geometrical shift, radiometric transformation and blurring transformation 111 may all be estimated by analyzing the coefficients of the local Fourier transform of the two image regions. Furthermore, one image region may be transformed to resemble the second image region in order to facilitate reliable detection of the differences between the two image regions 112 and 113.

Figure 2D:
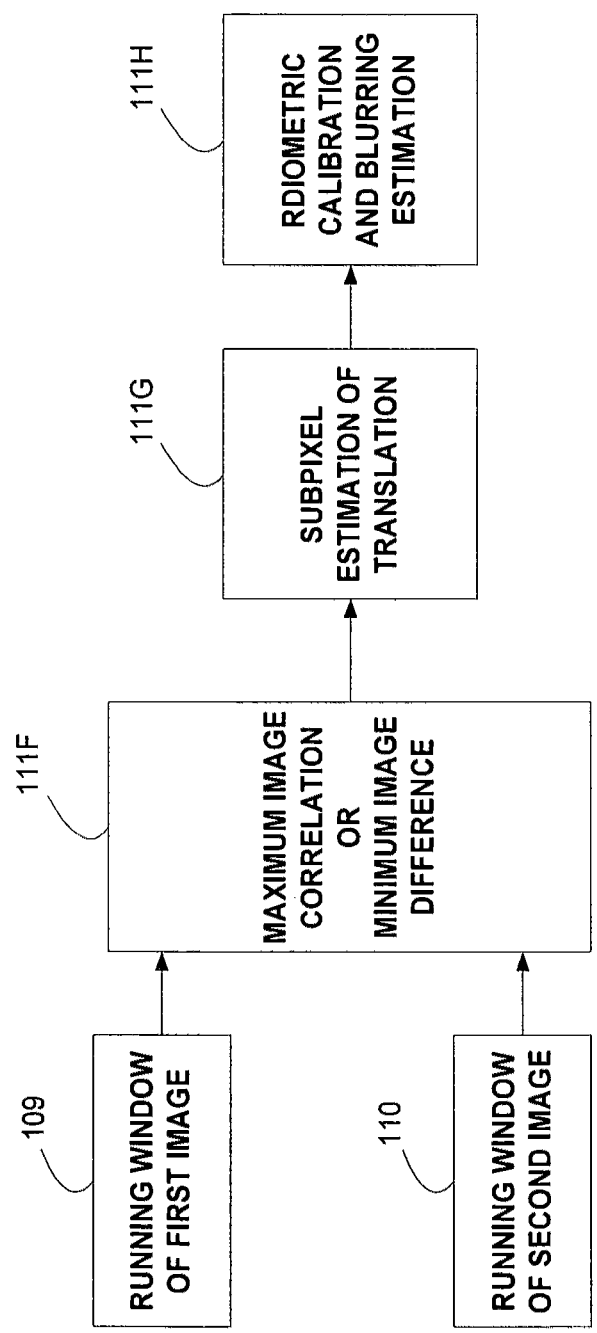
Figure 2E:
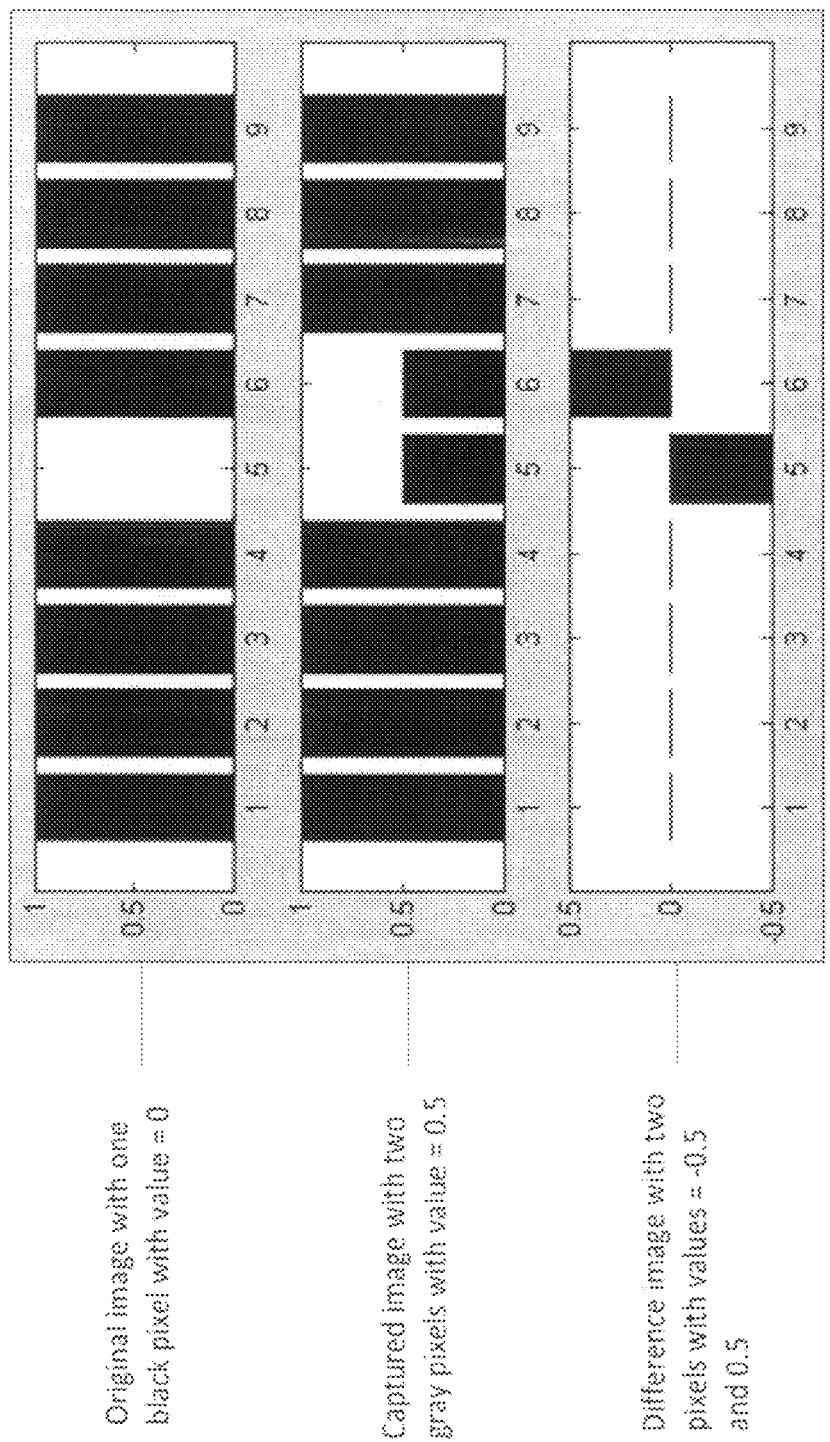
FIG. 2E depicts the difference between two images that were not registered with sub-pixel accuracy.

The two methods mentioned above estimate the local geometrical, radiometric and blurring transformations between the two images based on one integral analysis. Another method analyzes these transformations separately, as depicted in FIG. 2D. First, the geometrical shift is estimated by calculating the maximum correlation or minimum mean absolute difference or minimum square error between a region 109 in the first image and a corresponding region 110 in the second image at integer pixel shifts in the vertical and horizontal directions (step 111F). The shift at which the highest correlation or minimum difference is found is considered to be the integer pixel shift. Then a sub-pixel shift is calculated by method 111G. One means of doing this is by fitting an appropriate curve to the values of the correlation function at the best fit position and at positions that are shifted by one pixel in both directions and finding the extremum point of the curve. In case a maximum correlation is calculated then the appropriate curve is a second order polynomial and the maximum value position of this curve is found. In case the minimum square error is calculated then the appropriate curve is a second order polynomial and the minimum value position of this curve is found. In case the minimum absolute error is calculated then the appropriate curve is a first order V shape curve and the minimum value position of this curve is found. The methods described above result in a sub-pixel estimate of the shift between the regions 109 and 110 of both images. It is evident to those who are knowledgeable in the art that other methods for sub-pixel shift estimation may be used such as optical flow. Specifically, the Lucas-Kanade method, Horn-Schunck method, Buxton-Buxton method or Black-Jepson method may be used. Alternatively, after calculating the integer pixel shift, one image region 109 may be interpolated to a higher resolution and shifted by integer pixels of the higher resolution image in order to estimate the correlation to the second image region 110.

After the sub-pixel shift is estimated in step 111G and applied to one image region, the features in one image region 109 should correspond closely to the features in the second image region 110, unless actual differences exist between the features. It may now be possible to estimate the radiometric and blurring transformation by creating a simplified model 111H of this transformation such as a three parameter model including brightness, contrast and blur width per color plane. The parameters of this model may be estimated using a Least Squares algorithm or other optimization algorithm. The resulting optimal model 111 may be used to transform one image region 110 to best resemble the second image region 109 in order to facilitate reliable detection of the differences between the two image regions 112 and 113. Note that the blurring model does not necessarily have to be a Gaussian function and does not necessarily need to have only one parameter. For example, the blurring function may be a general blurring kernel such as a 3×3 or 5×5 matrix having general values. These values do not need to represent a symmetrical function.

It is important to note that while the description above described the required transformations for an image with one information plane, it is generally true also for multicolor images and specifically for color images represented by red, green and blue planes per image. In this case, a separate transformation may be applied to each color plane or one transformation may be applied to all planes. In addition, separate transformations do not have to be applied to the different color planes, but may also be applied to other color spaces such as HSI, LUV, YCrCc or any other color space.

The geometrical, radiometric and blurring transformations may be performed on the first image region 109 the second image region 110 or on both of them.

It should also be noted that the blurring process may also be a deblurring process that sharpens the image instead of blurring it.

It is important to note that in general the process 111 is intended to transform one or both of the image regions 109 and 110 so that they appear as similar as possible for the sake of accurate image comparison.

After the two image regions 109 and 110 have been transformed so they resemble each other in the geometrical, radiometric and blurring characteristics, the two image regions 112 and 113 may be compared. It is important to understand that accurate sub-pixel registration, radiometric calibration and blurring are essential in order to reduce the differences between images of similar text. Failing to do so would result in significant differences between images of the same text. This would increase the noise and reduce the sensitivity of the method.

FIG. 2E demonstrates the effect of misregistration between two image regions by half a pixel. In this figure a line scan of each image is represented where the height of the graph represents the intensity of the image. Value level zero represents black and value level one represents white. In the original image of the text all pixels are white except for one pixel that is black. In the captured image, the black point is smeared on two pixels and each of these pixels has a value of 0.5. The comparison method is simply the pixel by pixel subtraction of the two images. One may notice that the difference image has significant error values of −0.5 and 0.5. The sum of the absolute values of the difference is equal to 1. This example demonstrates that a large error results from the comparison of similar text when the characters are not aligned with sub-pixel accuracy. Similar errors occur when the images do not have the same radiometric calibration or the same blurring.

Another process that may assist in the comparison of the image regions 112 and 113 is preprocessing, which may preferably be done following the geometrical, radiometric and blurring transformation described above, but may alternatively done before these transformations. The preprocessing stage may consist of, but is not limited to, filtering the image in order to remove noise. This is especially desirable if one or more of the images 104, 105 is acquired by a camera, especially a low quality camera such as the cameras that are typical to mobile handheld devices, and in cases of low illumination. The filtering may be linear or nonlinear such as edge preserving noise removal filters, i.e. bilateral filters.

Another form of preprocessing may be filters designed at removing artifacts caused by compression of the images, i.e.

in JPEG format. Such filters are designed to remove the blocking and mosquito effects that are typical to JPEG images.

The result of the geometrical, radiometric, blurring and preprocessing stages is that the two images 107 and 108 are now aligned at a sub-pixel level and have similar radiometric and blurring properties. These new images 112A and 113A may now be compared.

When the two images 112A and 113A are ready for comparison, they may be compared (Step 114) in order to find the differences. One method for comparison may be the subtraction of the two images 112A and 113A. In regions where there are no real differences between the original documents 100 and 101, the resulting difference image 115 should consist of relatively low values. However, in areas where the original images are not similar such as when characters are added, deleted or changed, the difference image 115 should consist of relatively high values.

Therefore, a thresholding operation on the difference image 115 can separate areas where the chance of a real change in the original images is low and areas where the chance of a real change is high. The threshold does not necessarily have to be constant for the whole image. It may vary from region to region. Raising or lowering the threshold may assist in determining the sensitivity of the system to changes between the documents with respect to the false positive rate.

Alternatively, the two color or gray level images 112A and 113A may be thresholded before the subtraction of the images to obtain two binary images. Then the binary images can be compared, i.e. by subtraction.

After subtraction and thresholding or thresholding and subtraction, the resulting difference image 115 may be further post-processed in order to remove differences that are probably not due to real changes between the original documents. One such example is the usage of homomorphic filters such as opening and closing and their combinations in order to remove differences that are only a few pixels wide and probably do not result from real changes between the original documents.

One knowledgeable in the art may understand that the examples described above are only a few examples of the methods that may be used for preprocessing, comparison and postprocessing of the two images 112A and 113A.

As a result of the comparison stage 114, differences between the images, if they exist, are detected. These differences may be stored and displayed to the user by a process 116.

In one embodiment of the invention, the changes between the documents are displayed on the screen of a computer or on a screen of a mobile device that was used to capture the image of the first document. The display application 116 could include a user interface enabling quick and easy movement between the pages of the document and highlighting of the detected differences. The application 116 could also include a split screen showing the two documents at the same position in the document facilitating the comparison of the documents for verifying the detections of the automatic detection system. The display method could also apply flickering of the two images in order to enhance the changes between the two images.

In another embodiment of the invention, the comparison of the imaged or scanned document and the text document serves as a verification stage for improving the performance of an Optical Character Recognition (OCR) algorithm.

Figure 3:
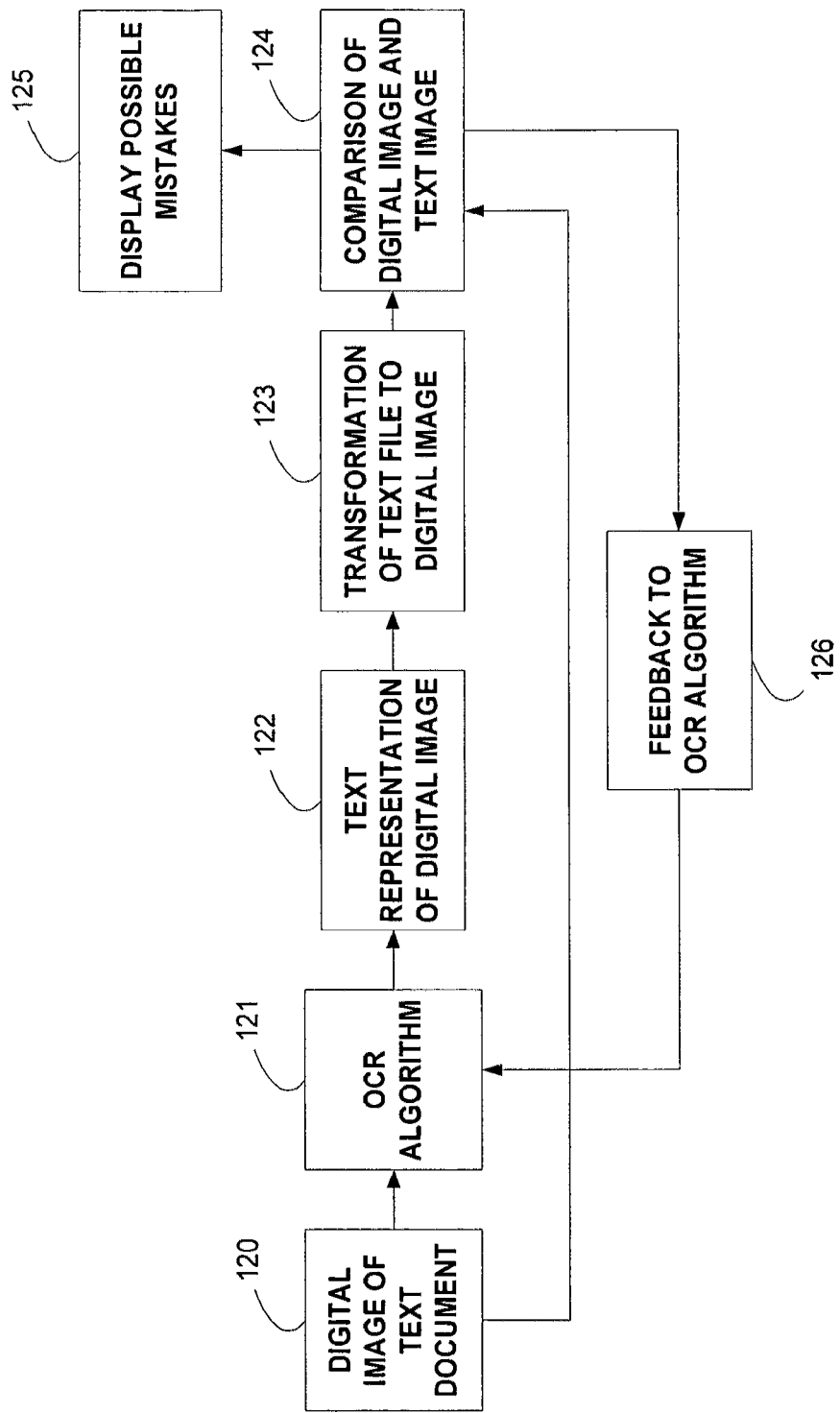
FIG. 3 depicts a simplified block diagram of an improved OCR algorithm that uses the image comparison method as a feedback stage for detecting errors made by the OCR algorithm.

Referring to FIG. 3, a typical OCR algorithm 121 receives a scanned or photographed image 120 of a text document and uses a variety of algorithms such as Neural Networks or maximum correlation in order to create a text file 122 that represents the printed document. In many cases there are errors in the recognition of characters, words, the document's layout, borders of tables and the document's colors in the printed text which result in errors in the text file 122 created by the OCR program.

The OCR algorithm is not limited to paper documents, and may also be applied to recognizing text on boxes, signs, on a TV screen, etc.

In the described embodiment, the text file 122 produced by the OCR software 121 is transformed into an image by any process 123 known in the art, such as a PDF converter. The resulting image may be compared to the image 120 of the document that was scanned or photographed, by image comparison method 124 comprising geometrical, radiometric and blurring transformations, as described above.

If differences are found that are believed to result from incorrect detection of characters, words, the document's layout, borders of tables and the document's colors, then these characters or words may be highlighted and displayed by method 125 in order to facilitate reviewing by a reader.

Furthermore, the differences may serve in a feedback stage 126 in order to improve the guess regarding the characters, words, the document's layout, borders of tables and the document's colors and replacing them by another character, word or by changing the document's layout, incorporating borders of tables and including colors in the output text of the OCR software.

For example, many OCR applications miss dots at the end of sentences or in abbreviations because these dots are small, consisting of few pixels, and may be blurry. If these dots are missing from the text document created by the OCR application then it would be missing from the image simulation of this OCR text output. However, the dots are present in the digital image of the document as a few black or gray pixels. This difference may be detected at the image comparison step 114 and fed to the improved OCR algorithm as a feedback signifying that a dot is missing.

Figure 6:
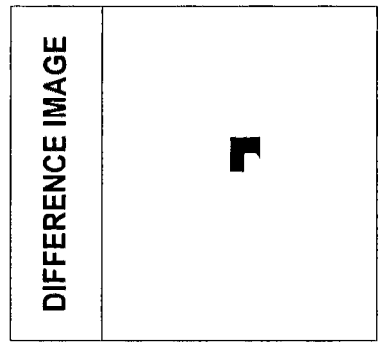
FIG. 6 exemplifies character misinterpretation by an OCR algorithm.
Figure 6:
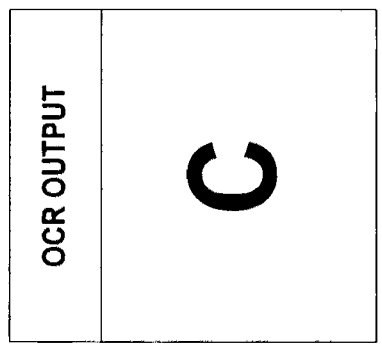
Figure 6:
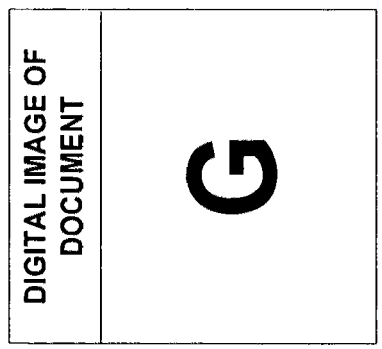

In another example, as depicted in FIG. 6, an OCR algorithm may misinterpret an image of the letter G as the letter C. The simulation of the text that is output by the OCR algorithm would not include the little line that differentiates the character G from the character C. However, this line is present in the digital image of the document as a few black or gray pixels in the middle of the character. This difference may be detected at the image comparison step 114 and fed to the improved OCR algorithm as a feedback signifying that the correct character is a G and not a C.

In another example, an OCR algorithm may correctly detect a character but does not correctly detect its font type or its font size. This results in a difference between the captured image of the character and the simulated image of the character. For example, the image of the character 'I' in Arial font is different from the image of the character 'I' in Times New Roman font. The Times New Roman font has a line at the top of the character and a line at the bottom of the character that do not exist in the Arial font. This difference may be detected at the image comparison step 114 and fed to the improved OCR algorithm as a feedback signifying that the font type should be corrected. Similarly, the image of a character at font 10 is smaller than the image of a character in font 14. This difference may be detected at the image comparison step 114 and fed to the improved OCR algorithm as a feedback signifying that the font size should be corrected.

In another example, the color of the text or lines may not be correctly identified by the OCR algorithm. The simulation of the text or lines creates an image in which the words are correct but their color is different than in the original image of the text. This may be detected by the image comparison step 114, when performed on separate color planes. The required color correction is fed back to the OCR algorithm in order to correct the positioning of these elements in the page.

In yet another example, as depicted in FIG. 7, an OCR algorithm may not correctly detect the lines that form the border of tables or the line under underlined text. The simulation of the text that is output by the OCR algorithm would not include these lines. However, the lines are present in the digital image of the original document as a line of black or gray pixels. This difference may be detected at the image comparison step 114 and fed to the improved OCR algorithm as a feedback signifying that lines should be added to the table or under the text.

In another example, characters or lines are correctly detected, but the resulting text is not positioned correctly in the output document. The simulation of the text or lines creates an image in which the words are correct but the positioning is different than in the original image of the text. This may be detected by the global geometrical transformation 106 or the local geometrical transformation 111 or by the image comparison step 114. The displacement of the simulated text or lines is fed back to the OCR algorithm in order to correct the positioning of these elements in the page.

The feedback loop may operate more than one time. Several iterations may be performed until a certain criterion is met, such as a given number of iterations or until the difference between the image of the original text and the image of the simulated text is determined to be significantly small.

A minimum difference criterion or maximum likelihood criterion may be applied in order to find the best possible match for a character or word.

A maximum likelihood criterion may include several probabilities contributing to the likelihood of a certain guess regarding a character, word, the document's layout, borders of tables and the document's colors. For example, the likelihood function may take into account the a priori probability of a certain combination of characters, i.e. by assigning higher probabilities to words in a dictionary or lexicon or to words that seem relevant in the context of the whole sentence. This is combined with another probability that a specific character or word is indeed the correct word by comparing the simulated image of the character or word to the image of the character or word in the digital image. A small difference between the simulated image of the character or word and the actual image of the character or word would result in a high probability, while a large difference would result in a low probability. The combination of all the probabilities would yield the maximum probability for a certain character or word.

The method described above is not limited to the verification stage and to improvement of an existing OCR algorithm but may also serve as the basis of a more general OCR algorithm which aims to minimize the difference between the simulated image of an assumed text and an actual digital image of a text. The optimization function may be a minimum difference between the simulated and actual digital images or a maximum likelihood function that also combines other a priori knowledge regarding the probability of a character or word.

Figure 4:
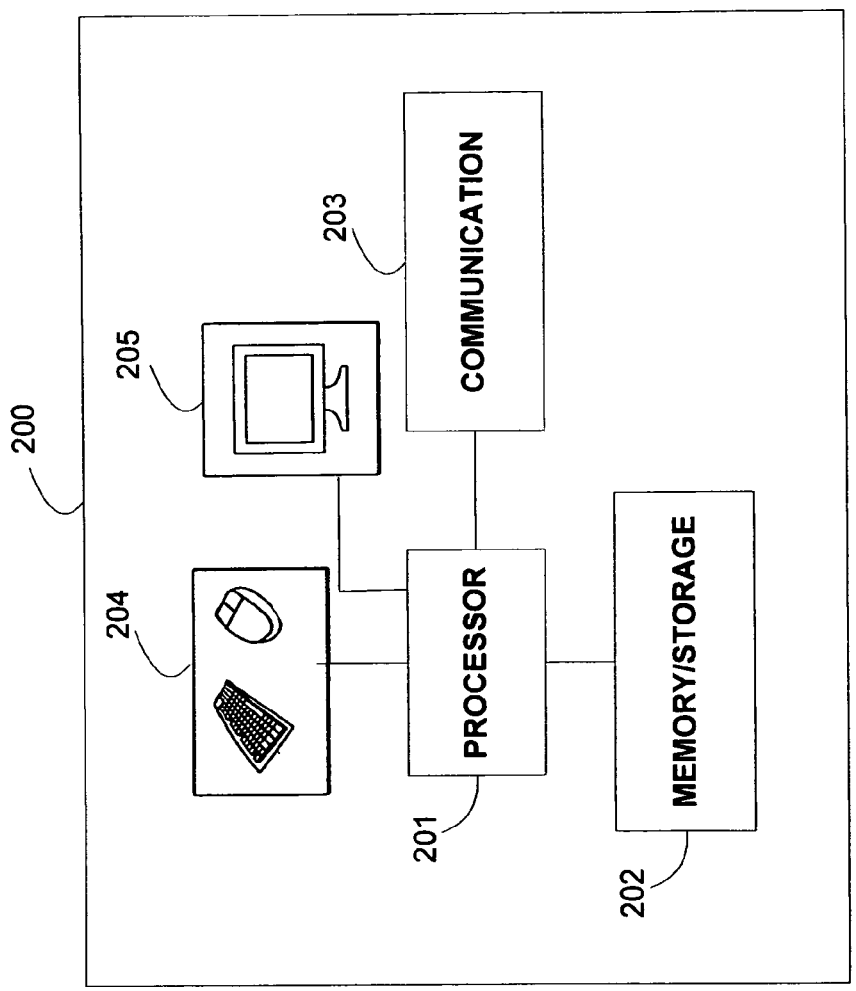
FIG. 4 is a simplified block diagram of a computer system provided in accordance of aspects of the invention.

FIG. 4 is a simplified block diagram of a computer system 200 provided in accordance of aspects of the invention. The computer system 200 includes a processor 201, which in practice may be constituted of one or more microprocessors. The computer system 200 also includes one or more memory/storage devices 202 communicating with the processor 201.

For example, the memory/storage device(s) may include read only memory (ROM), random access memory (RAM), flash memory, one or more hard disk drives, removable storage media drives, etc. The memory/storage device(s) 202 may function as both program and working memory and may store various software programs such as an operating system, a scanner driver, a word processing application such as Microsoft Word, an application for converting a text file into an image file, such as a PDF converter, an OCR application and an application to provide the functionality for performing the method of the present invention. The computer system 200 additionally comprises communication means 203, wireless and/or other, for providing the capability of acquiring digital images taken by a mobile digital camera, according to the present invention.

In addition, the computer system 200 may include other input devices 204 and/or output devices 205 in communication with the processor 201, such as a keyboard, a mouse, a display device and a printer.

Figure 5:
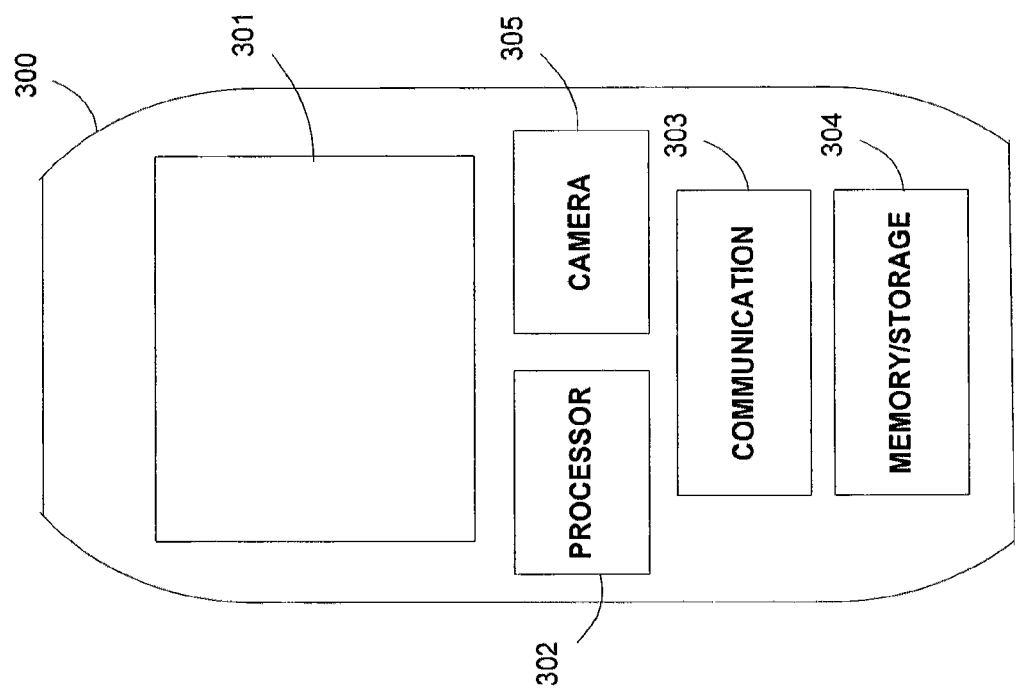
FIG. 5 is a simplified block diagram of a smartphone system provided in accordance of aspects of the invention.

In an alternative configuration, as depicted in FIG. 5, the system of the present invention may comprise a smartphone or tablet PC 300 comprising a display 301, a processor 302, communication means 303 and memory/storage 304 and a digital camera 305. The memory/storage device(s) 304 may function as both program and working memory and may store various software programs such as an operating system, a camera driver, a word processing application such as Microsoft Word, an application for converting a text file into an image file, such as a PDF converter, an OCR application and an application to provide the functionality for performing the method of the present invention.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description. For example, the geometrical, radiometric and blurring transformations described above for rendering the two images similar may be applied to any one of the two images or to both images.

The invention claimed is:

1. A computerized method comprising:
    a. obtaining a first digital image of a first document page;
    b. obtaining a second digital image of a second document page;
    c. performing global geometrical transformation on at least one of said first and second digital images to obtain first and second aligned digital images;
    d. selecting a window of said first aligned digital image;
    e. selecting a window of said second aligned digital image;
    f. estimating residual local geometrical shifts, radiometric differences and blurring differences between said selected windows to obtain a second transformation;

g. applying said second transformation to at least one of said windows;

h. repeating steps (d) through (g) for consecutive windows of said first and second aligned images to obtain first and second similar images;

i. comparing said first and second similar images to obtain a difference image;

j. analyzing said difference image to determine whether at least one of the group consisting of: characters, images and components thereof have been added, deleted, changed or shifted; and k. displaying said differences.

2. The method of claim 1, wherein said obtaining a digital image comprises scanning a paper document.

3. The method of claim 1, wherein said obtaining a digital image comprises capturing the image with a digital camera.

4. The method of claim 3, wherein said digital camera is part of a handheld processing device.

5. The method of claim 4, wherein said handheld processing device is a one of a smartphone and a tablet PC.

6. The method of claim 1, wherein said obtaining a digital image comprises converting an electronic text file to a digital image file.

7. The method of claim 1, wherein said obtaining a digital image comprises retrieving the image from storage.

8. The method of claim 1, wherein said obtaining a digital image comprises communicating the digital image to a computer.

9. The method of claim 1, wherein said obtaining a digital image comprises communicating the digital image to a handheld processing device.

10. The method of claim 9, wherein said handheld device is one of a smartphone and a tablet PC.

11. The method of claim 1, wherein said global geometrical transformation comprises at least one of translation in the vertical and horizontal axes, magnification, rotation, skewing and optical distortion correction.

12. The method of claim 1, wherein the global geometrical transformation comprises:

a. detecting features in said first and second digital images; and b. matching between said detected features.

13. The method of claim 1, wherein said estimating residual geometrical shifts, radiometric differences and blurring differences comprises applying a linear convolution and adding a constant to the window of said second aligned digital image.

14. The method of claim 13, wherein the convolution coefficients and constant level are calculated as a linear combination of several windows, said windows comprising translations of said selected window of said second aligned digital image and a constant level.

15. The method of claim 1, wherein said estimating residual geometrical shifts, radiometric differences and blurring differences comprises applying a local Fourier analysis to said first selected window of said first aligned digital image and comparing it to the Fourier analysis of said selected window of said second aligned digital image.

16. The method of claim 15, wherein said residual geometrical shifts between features in said selected window of said first aligned image and corresponding features in said selected window of said second aligned image are derived by finding the linear shift of the phase in the frequency analysis.

17. The method of claim 15, wherein said blurring and radiometric differences between said selected window of said first aligned image and said selected window of said second aligned image are estimated by calculating the ratio of the amplitudes of the coefficients in the frequency analysis and fitting an appropriate model.

18. The method of claim 1, wherein said residual geometrical shifts between features in said selected window of said first aligned image and corresponding features in said selected window of said second aligned image are derived by:

a. calculating the integer pixel shift between said selected window of said is first aligned image and said selected window of said second aligned image; and b. calculating the sub-pixel shift between said selected window of said first aligned image and said selected window of said second aligned image.

19. The method of claim 18, wherein said calculating the integer pixel shift comprises calculating one of the maximum correlation and the minimum difference between said windows in the vertical and horizontal directions and finding the shift at which the highest correlation or minimum difference is found.

20. The method of claim 19, wherein said calculating the sub-pixel shift comprises fitting a second order curve to the values of the correlation function at the best fit position and at positions that are shifted by one pixel in both directions and finding the maximum value position of said second order curve.

21. The method of claim 18, wherein said calculating the sub-pixel shift comprises calculating the mean square error of the two image windows, fitting a second order curve to the values of the mean square error function at the best fit position and at positions that are shifted by one pixel in both directions and finding the minimum value position of said second order curve.

22. The method of claim 18, wherein said calculating the sub-pixel shift comprises calculating the mean absolute difference between the two image windows, fitting a V shape curve to the values of the mean absolute difference function at the best fit position and at positions that are shifted by one pixel in both directions and finding the minimum value position of said V shape curve.

23. The method of claim 1, wherein at least one said global and local geometrical transformations is calculated using an optical flow algorithm.

24. The method of claim 1, wherein at least one said global and local geometrical transformations is calculated by interpolating one or both of the images to increase their resolution and performing an integer pixel translation on the images of increased resolution.

25. A system comprising:

a processor;

communication means connected with the processor;

display means;

means for obtaining a first digital image of a first document page;

means for obtaining a second digital image of a second document page; and memory means coupled to the processor, said memory means configured to store a plurality of modules for execution by the processor, the plurality of modules comprising:

logic for performing global geometrical transformation on at least one of first and second digital images to obtain first and second aligned digital images;

logic for selecting a window of said first aligned digital image;

logic for selecting a window of said second aligned digital image;

logic for estimating local residual geometrical shifts, radiometric differences and blurring differences between said selected windows to obtain a second transformation;

logic for applying said second transformation to at least one of said windows;

logic for repeating said estimating and applying for consecutive windows of said first and second aligned images to obtain first and second similar images;

logic for comparing said first and second similar images to obtain a difference image;

logic for analyzing said difference image to determine whether one or more characters have been added, deleted, changed or shifted; and logic for displaying said changes between the images.

26. The system of claim 25, wherein said logic for performing global geometrical transformation comprises logic for performing at least one of translation in the vertical and horizontal axes, magnification, rotation, skewing and optical distortion correction.

27. The system of claim 26, wherein said logic for performing global geometrical transformation comprises:
   a. logic for detecting features in said first and second digital images; and
   b. logic for matching between said detected features.

28. The system of claim 25, wherein said logic for estimating residual geometrical shifts, radiometric differences and blurring differences comprises logic for applying a linear convolution and adding a constant to the window of said second aligned digital image.

29. The system of claim 28, wherein said logic for applying a linear convolution and adding a constant comprises logic for calculating the convolution coefficients and constant as a linear combination of several windows, said windows comprising translations of said selected window of said second aligned digital image and a constant.

30. The system of claim 25, wherein said logic for estimating residual geometrical shifts; radiometric differences and blurring differences comprises logic for applying a local Fourier analysis to said first selected window of said first aligned digital image and comparing it to the Fourier analysis of said selected window of said second aligned digital image.

31. The system of claim 30, wherein said logic for estimating residual geometrical shifts between features in said selected window of said first aligned image and corresponding features in said selected window of said second aligned image comprises finding the linear shift of the phase in the frequency analysis.

32. The system of claim 30, wherein said logic for estimating blurring and radiometric differences between said selected window of said first aligned image and said selected window of said second aligned image comprises logic for calculating the ratio of the amplitudes of the coefficients in the frequency analysis and fitting an appropriate model.

33. The system of claim 25, wherein said logic for estimating residual geometrical shifts between features in said selected window of said first aligned image and corresponding features in said selected window of said second aligned image comprises:
   a. logic for calculating the integer pixel shift between said selected window of said first digital image and said selected window of said second digital image; and
   b. logic for calculating the sub-pixel shift between said selected window of said first digital image and said selected window of said second digital image.

34. The system of claim 33, wherein said logic for calculating the integer pixel shift comprises logic for calculating one of the maximum correlation and the minimum difference between said windows in the vertical and horizontal directions and finding the shift at which the highest correlation or minimum difference is found.

35. The system of claim 34, wherein said logic for calculating the sub-pixel shift comprises logic for fitting a second order curve to the values of the correlation at the best fit position and at positions that are shifted by one pixel in both directions and finding the maximum value position of said second order curve.

36. The system of claim 33, wherein said logic for calculating the sub-pixel shift comprises logic for calculating the mean square error of the two image windows, fitting a second order curve to the values of the mean square error function at the best fit position and at positions that are shifted by one pixel in both directions and finding the minimum value position of said second order curve.

37. The system of claim 33, wherein said logic for calculating the sub-pixel shift comprises logic for calculating the mean absolute difference between the two image windows, fitting a V shape curve to the values of the mean absolute difference function at the best fit position and at positions that are shifted by one pixel in both directions and finding the minimum value position of said V shape curve.

38. The system of claim 25, wherein at least one said logic for performing global and local geometrical transformations comprises logic for calculating an optical flow.

39. The system of claim 25, wherein at least one said logic for performing global and local geometrical transformations comprises logic for interpolating one or both of the images to increase their resolution and performing an integer pixel translation on the images of increased resolution.

40. The system of claim 25, wherein said means for obtaining a digital image comprise a scanner.

41. The system of claim 25, wherein said means for obtaining a digital image comprise a digital camera.

42. The system of claim 41, wherein said digital camera is part of a handheld processing device.

43. The system of claim 42, wherein said handheld processing device is one of a smartphone and a tablet PC.

44. The system of claim 25, wherein said means for obtaining a digital image comprise logic for converting an electronic text file to a digital image file.

45. The system of claim 25, wherein said means for obtaining a digital image comprise logic for retrieving the image from storage.

46. The system of claim 25, wherein said means for obtaining a digital image comprise means for communicating the digital image to a computer.

47. The system of claim 25, wherein said means for obtaining a digital image comprise means for communicating the digital image to a handheld processing device.

48. The system of claim 47, wherein said handheld device is one of a smartphone and a tablet PC.

* * * * *